United States Patent [19]

Wagstaff

[11] Patent Number: 4,695,191
[45] Date of Patent: Sep. 22, 1987

[54] HANDLING SYSTEM FOR EFFECTING A SUBMERGED COUPLING

[75] Inventor: William L. Wagstaff, Tarves, Scotland

[73] Assignee: The Floating Technology Company Limited, Greenford, England

[21] Appl. No.: 762,302

[22] Filed: Aug. 5, 1985

[30] Foreign Application Priority Data

Apr. 15, 1985 [GB] United Kingdom ................ 8509630

[51] Int. Cl.[4] ............................................. E02D 21/00
[52] U.S. Cl. .................................... 405/195; 405/169; 405/171; 166/338; 166/345
[58] Field of Search ............... 405/195, 169, 170, 171; 166/342, 343, 345, 338

[56] References Cited

U.S. PATENT DOCUMENTS

| | | | |
|---|---|---|---|
| 3,640,400 | 2/1972 | Becraft | 405/154 X |
| 4,234,269 | 11/1980 | Person et al. | 405/195 |
| 4,386,874 | 6/1983 | Engelsen et al. | 405/195 X |
| 4,423,983 | 1/1984 | Dadiras et al. | 405/195 |
| 4,423,984 | 1/1984 | Panicker et al. | 405/195 |
| 4,436,451 | 3/1984 | Anderson | 405/195 |
| 4,448,568 | 5/1984 | Gentry et al. | 405/195 X |
| 4,470,721 | 9/1984 | Shotbolt | 405/195 |
| 4,470,772 | 9/1984 | Gregory | 405/195 |
| 4,490,073 | 12/1984 | Lawson | 405/169 |
| 4,497,342 | 2/1985 | Wenzel et al. | 405/195 X |
| 4,556,341 | 12/1985 | Ayers | 405/195 |

Primary Examiner—Richard J. Scanlan, Jr.
Assistant Examiner—Kristina Hall
Attorney, Agent, or Firm—Glaser, Griggs & Schwartz

[57] ABSTRACT

An offshore oil platform (1) is provided with an improved riser handling system for making a subsea connection of a riser (6) to the platform, without the need for divers or boats to move the riser into position. A first coupling part (7) on the riser (6) is releasably coupled to a second coupling part (8) which in turn is releasably connected to a third coupling part (9) mounted in a submerged position on the platform. The second coupling part (8) is used as a guide to position the riser. The part (8) is coupled to cables (12,14) wound by winches (13,15). In use the riser can be released from the position shown in FIG. 1 to fall to the sea bed. To reconnect the riser, it is raised by davit (16) onto a platform (17), where the second coupling part (8) is fitted onto the part (7) on the riser. The cables (12,14), are then adjusted to draw the second coupling part (8) and hence the riser to the third coupling part (9) for connection therewith.

5 Claims, 5 Drawing Figures

HANDLING SYSTEM FOR EFFECTING A SUBMERGED COUPLING

FIELD OF THE INVENTION

This invention relates to a handling system for effecting a submerged coupling for a flexible pipe or group thereof such as a riser on a floating structure such as a floating oil production platform.

BACKGROUND TO THE INVENTION

Typically, on a floating oil production platform, the risers connect with a submerged pontoon on the platform via a coupling which has to be disconnected and reconnected, e.g. for inspection and maintenance purposes, using small handling boats and/or divers.

It is an object of this invention to provide a handling system which enables a flexible pipe to be lowered from an upper deck of a semisubmersible or monohull vessel and to be connected at a coupling on the underside of the hull, beneath the waterline, without external assistance such as small boats and/or divers.

SUMMARY OF THE INVENTION

In an embodiment of the invention a floating structure e.g. an offshore oil platform is provided with an improved handling system for effecting a submerged coupling of a riser or pipe to the structure, wherein the handling system includes a first coupling part on the riser, a second or intermediate part for releasable connection to the first part, and a third coupling part at a submerged position on the floating structure. Control means, typically in the form of winched lifting cable means is provided to move the second coupling part between the submerged position at which the second part can latch to the third part, and another location, typically above the water on the platform, at which the first part and hence the riser can be coupled to the second part. Thus, by shifting the second coupling part between the above water location and the submerged position, the riser can be connected to the platform without the need for small boats and divers.

Conveniently the first coupling part is releasable from the second part, to permit release of the riser when the platform is to be moved. A pennant buoy may be attached to the riser to mark its position so that it can later be lifted to the above water location for reconnection to the second coupling part. A davit may be provided on the platform to lift the riser by lifting the pennant buoy. The davit is preferentially disposed adjacent a maintenance platform which is mounted to the side of the upper deck. The platform may have a cradle for holding the first coupling part when the latter is lifted by the davit, thereby to enable the second coupling part to be recoupled by lowering said cable supported second coupling part on top of said first coupling part.

The davit is preferably swingable between off-board and on-board positions.

The third coupling part is preferably mounted to a mounting tank on the underside of a hull or pontoon on the floating structure, the mounting tank having a pipe flanged thereto which extends to the top of the hull or pontoon for passage of the lifting cable.

In the preferred arrangement, the first coupling part comprises a male part connected to the pipe or riser, the second coupling part comprises a coupling frame which assembles with the male part via spring loaded mechanical latches, and the third part comprises a female part to which the coupling unit (assembled coupling frame and male part) couples via a latch in the form of an hydraulic clamp. Operation of the clamp forces mating faces on the male and female parts into sealing engagement.

BRIEF DESCRIPTION OF THE DRAWINGS

A practical arrangement of a riser handling system will now be described by way of example with reference to the accompanying drawings, in which.

DESCRIPTION OF PREFERRED EMBODIMENTS

Figure 1:
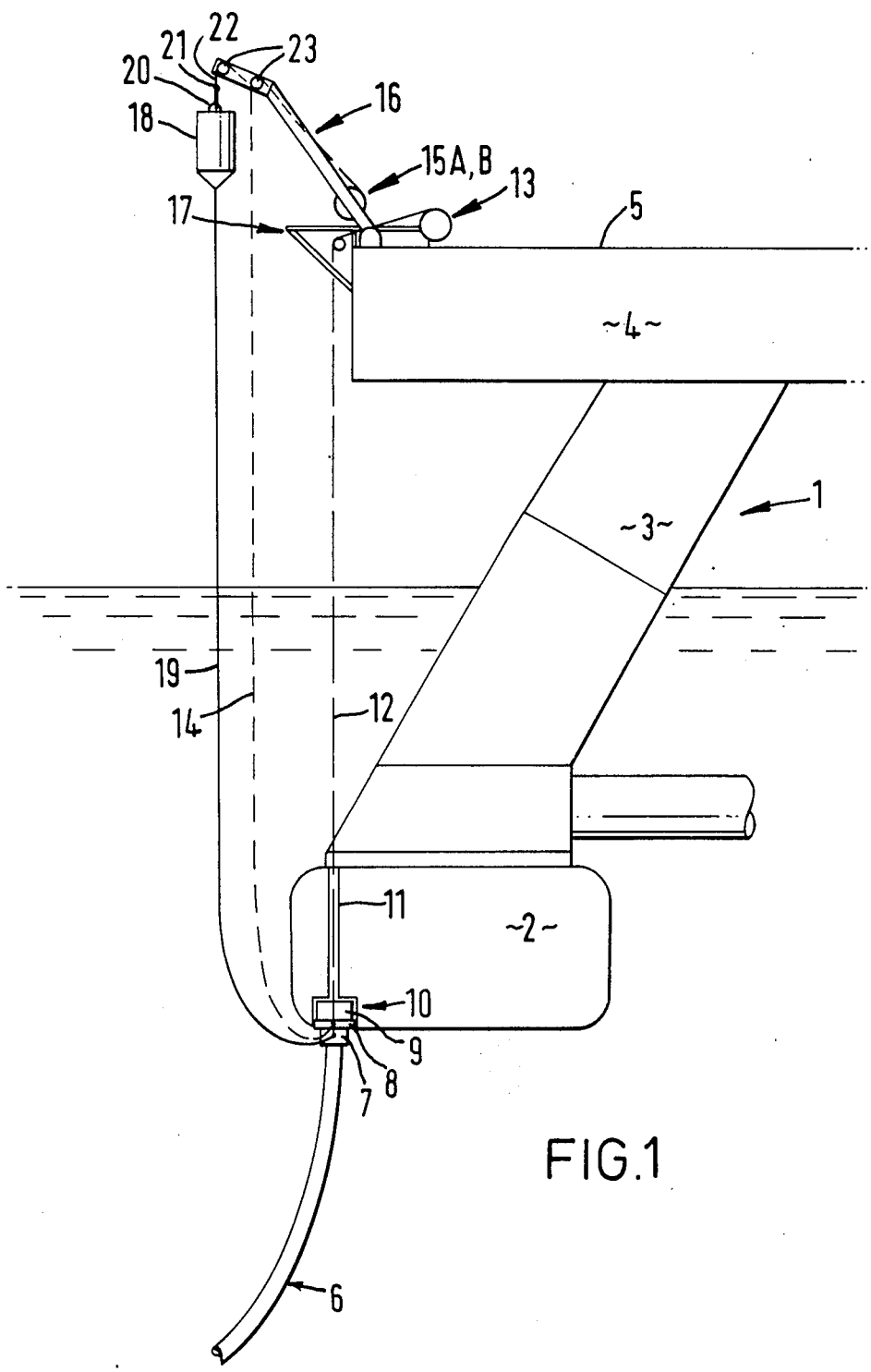
FIGS. 1 to 4 are similar side elevational views respectively showing the handling system, somewhat diagrammatically, at differing stages of operation.

A semi-submerged offshore oil production platform 1 consists of a submerged hull or pontoon 2 connected by legs 3 to a deck box 4 having an upper deck 5.

The production platform 1 is provided with an improved riser handling system which connects a oil production riser 6 extending from the sea-bed to the pontoon 2.

The end of the riser 6 is fitted with a first, male coupling part 7 which is releasably coupled to a second coupling part 8 that itself is releasably coupled to a third, female coupling part 9 fixedly mounted in a tank or recess 10 in the underside of the pontoon 2.

The mounting tank 10 is a steel fabrication, which forms a recess into the bottom of the pontoon or hull 2. Two pipes 11 (only one being visible in FIGS. 1 to 4) are flanges to the top of the mounting tank, and pass vertically upwards through the pontoon 2 where they are flanged to the underside of the pontoon top shell plating. These pipes have bell mouths to allow easy entry of lifting wires 12, which pass through the pipes. The lifting wires are used to pull the riser into the mating position under the pontoon, and are operated by a winch 13 on the upper deck 5. Additionally a cable 14 is connected to the coupling frame 8, the cable 14 being wound on a first drum 15a of a two part winch 15 on a davit 16. Operation of the winches 15 and 13 allows the second coupling part 8 to be moved between a subsea position for connection to the female coupling part 9, and an above water location on a maintenance platform 17, as will be explained in more detail hereinafter.

The female part 9 of the coupling is bolted to the underside of the mounting tank 10 from inside the pontoon. The bolts are sealed where they pass through the mounting tank. Short lengths of pipe (not shown) are flanged to the top of the coupling where it passes throught the top of the mounting tank 10. These short lengths of pipe connect to solid risers (not shown) which pass through the pontoon 2 and leg 3 to the upper deck 5. To overhaul or replace the female part 9 of the coupling, the short lengths of pipe are disconnected and a steel dome is bolted to the top of the mounting tank 10 to cover the opening where the coupling protrudes through the top of the mounting tank. The lifting wires 12 which are normally attached to the coupling frame, are now shackled to the female part 9 of the coupling using divers, or a remote operated vehicle. The coupling part 9 is then unbolted from inside the pontoon and is lifted to the upper deck 5 using the lifting wires 12.

The male part 7 of the coupling fitted on the end of the flexible riser 6 is fitted with sealing rings (not shown) where it mates with the female part of the coupling. The male part 7 of the coupling is mounted on the second coupling part or frame 8 and is positioned under the pontoon 2 using the lifting wires 12 which are attached to the second coupling part. The male part 7 of the coupling enters the coupling frame 8 from the underside and is held in place by spring loaded mechanical latches (not shown). The first coupling part 7 can be disconnected from the coupling frame 8 by a hydraulic ram (not shown) which forces back the latches. The hydraulic ram is mounted on the female coupling part 9 and is operated from inside the pontoon 2. To separate the first coupling part 7 and the frame 8 when they are on the maintenance platform 17 a portable hydraulic ram and hand pump are used.

The male coupling part 7 has a wire bridle shackled to it, which in turn is connected to a pennant buoy 18 by a length of wire rope 19. During normal operation, the pennant buoy 18 hangs by a loop 20 from a hook 21 on the end of the handling davit 16. The hook can be manipulated from the navigation bridge to release the pennant buoy 18 when the riser 6 is disconnected from the tank 10. The pennant buoy 18 is fitted with an hydro-acoustic beacon which is used to locate the buoy when the riser 6 is being reconnected.

Figure 3:
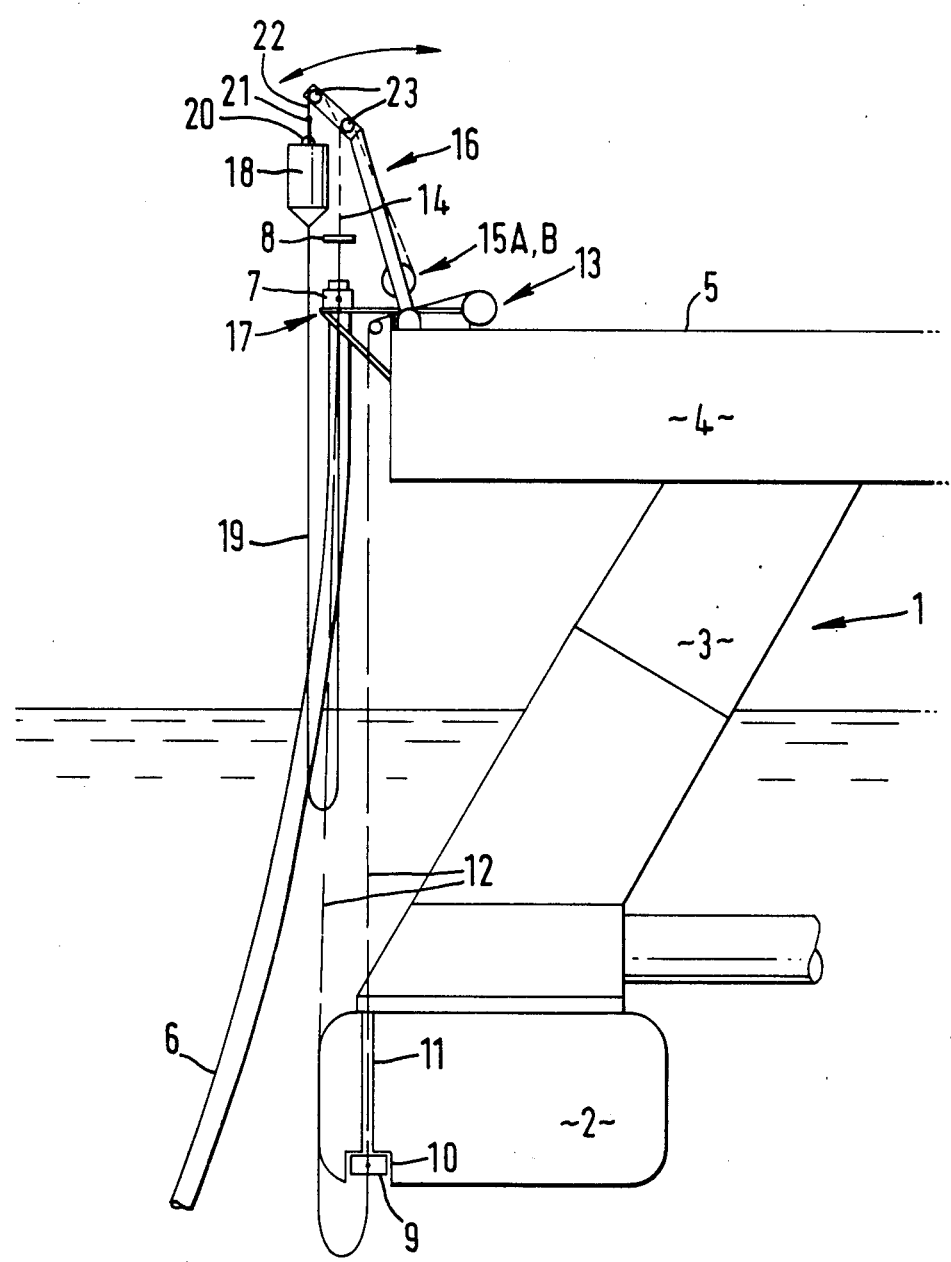

The handling davit 16 is mounted on the upper deck 5 as previously stated it has a twin drum winch for which the drum 15b controls a cable 22 attached to the hook 21. The davit also has four sheaves 23 which guide the supporting cables over the side of the deck box 4. The davit 16 has hydraulic rams which allow the davit to be swung inboard or outboard, as indicated in FIG. 3.

The maintenance platform 17 is a steel structure on the upper deck extending over the side of the deck box 4. The outboard edge of the platform 17 has a cradle (not shown) for holding the first male part 7 of the coupling whilst it is being inserted into the second coupling part 8. Access on the platform 17 is provided around the coupling to allow inspection, cleaning and replacement of the seals as necessary.

Figure 2:
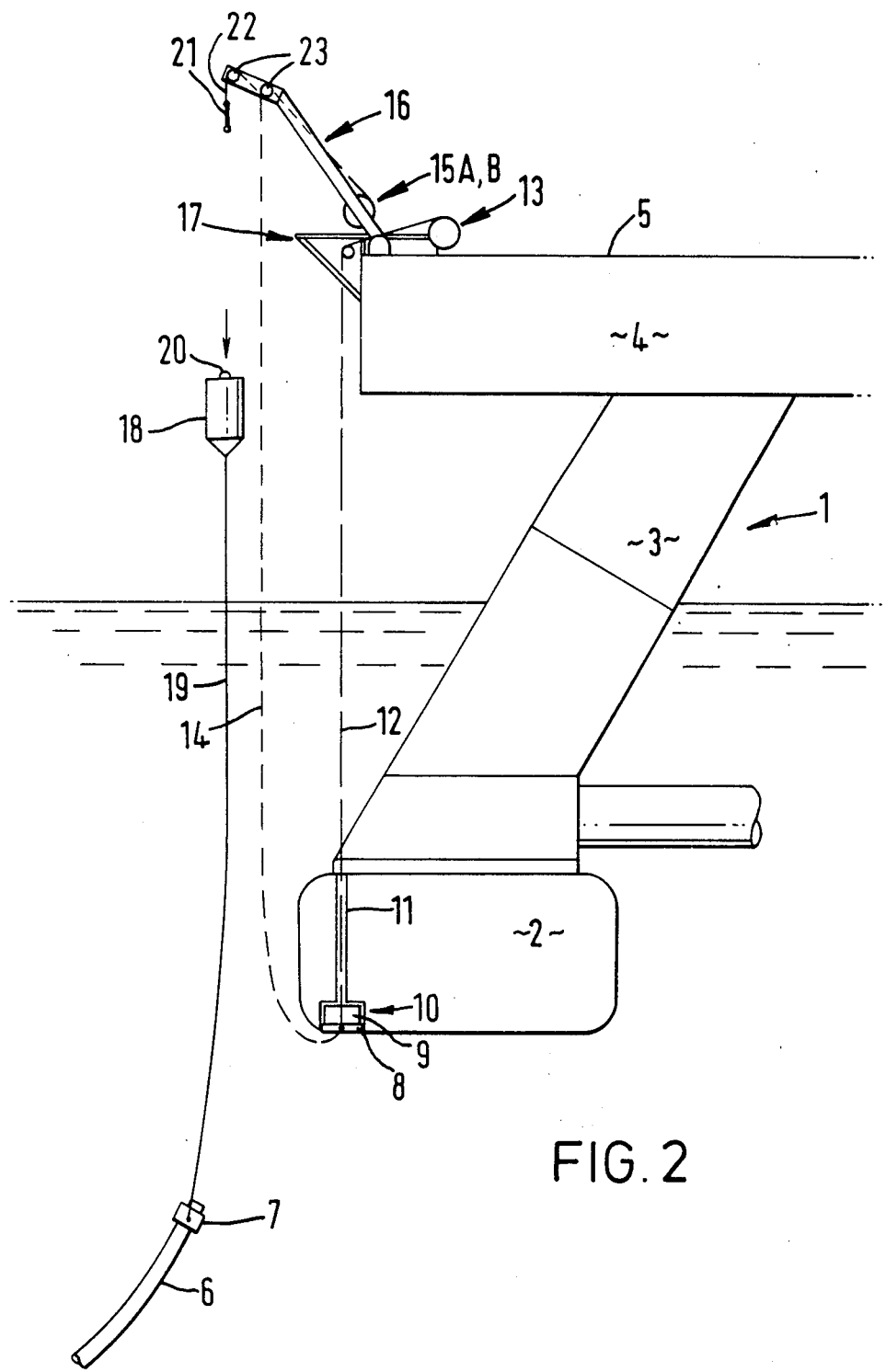
Figure 4:
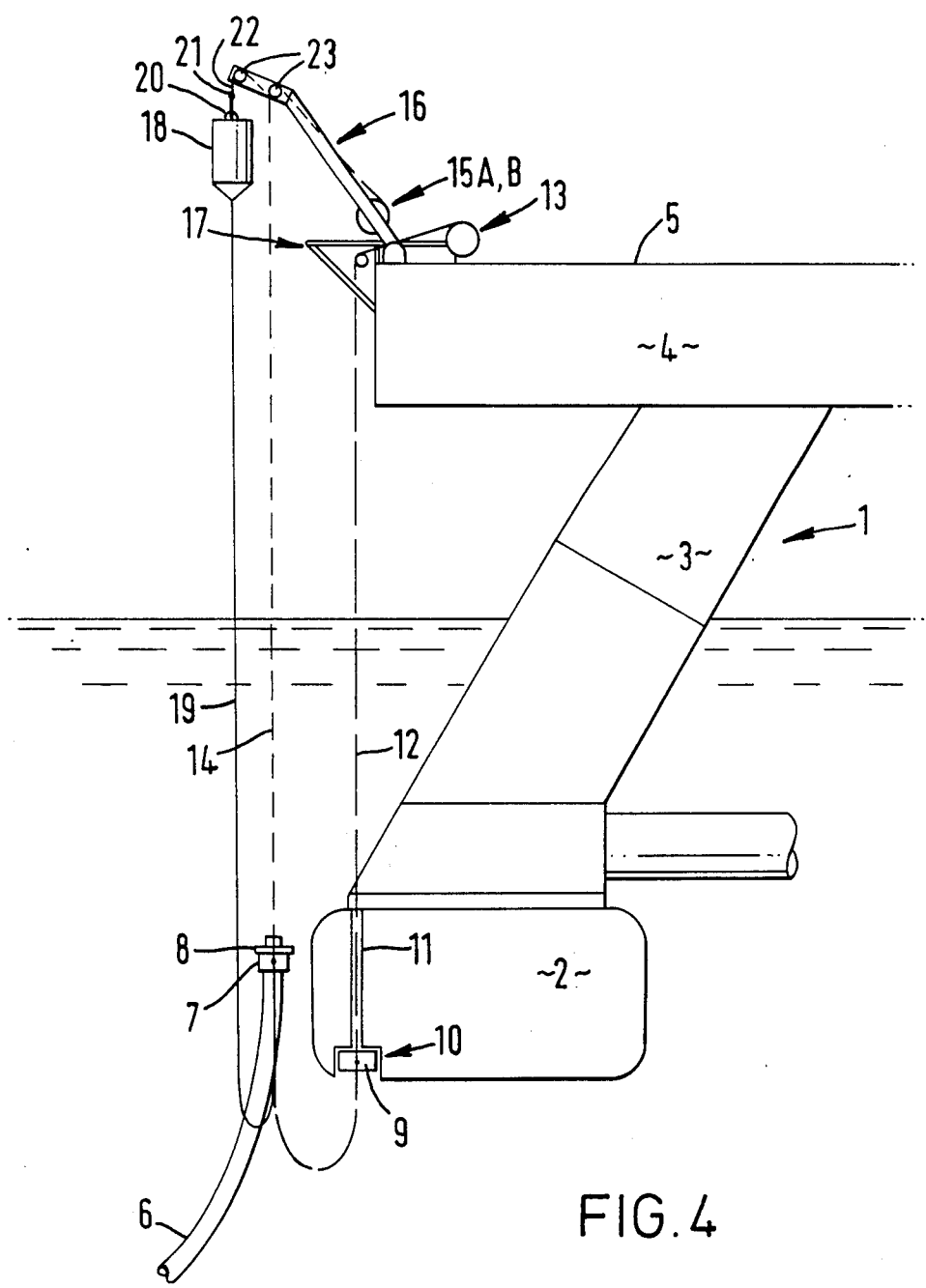

FIG. 1 shows the handling system during normal process operation. FIGS. 2 to 4 show the system at differing stages in a riser disconnection or reconnection process. First, as indicated in FIG. 2, the riser can be disconnected quickly if the riser is to be abandoned prior to moving the vessel off location. In this case the riser 6 is disconnected by releasing the first coupling part 7 from the second coupling part 8 so that the riser is allowed to fall to the seabed. The end is marked using the pennant buoy 19, which is released from the davit 16. Alternatively, as indicated in FIG. 3, the riser 6 can be disconnected from the bottom of the pontoon 2, and brought up to the maintenance platform 17 for the purposes of overhauling the coupling.

The sequence of operations for disconnecting the flexible riser 6 is as follows:

1. Flow valves are closed on the riser, and production is shut down from a process control room (not shown) on the platform.

2. Hydraulic clamps (not shown) which hold the male and female parts of the coupling 7,8,9 together, are operated; this separates the sealing faces of the coupling.

3. The latch which holds the first male part 7 of the coupling into the second coupling part or frame 8 is operated. The first coupling part 7 then falls away from the frame 8 and is pulled clear of the pontoon 2 by the horizontal force created by the weight of the riser 6 acting on the riser/pennant buoy wire catenary.

4. The pennant buoy 18 is released from the end of the davit 16 and is pulled below the surface by the weight of the riser 6.

5. The riser 6 is now lying on the sea bed, with the pennant buoy 18 approximately 50 meters above the sea bed, marking the end of the riser.

The riser is reconnected using the davit 16 without the use of divers. This allows the riser to be reconnected in any sea state, provided that men can work on the upper deck. FIG. 4 illustrates the reconnection stage.

The sequence of events for reconnecting the riser is as follows:

1. The pennant buoy 18 is located by means of the hydro-acoustic beacon attached to it.

2. If the pennant buoy 18 is within the operating radius of the davit 16 it may be recovered directly, by using the crane hook. The crane hook is fitted with a lifting device which has underwater lights and a video camera mounted on it. The closed circuit television display unit is mounted in the crane driver's cab. If the pennant buoy is not within the operating radius of the davit an ROV will be launched to attach a wire to the buoy to allow it to be recovered.

3. The second coupling part 8 is lifted to the upper deck 5 by the cable connection 14 to the davit 16, which is then swung inboard.

4. The pennant buoy 18 is lifted by the davit 16 and lowered onto its hook at the top of the davit. The first coupling part 7 and riser 6 are then raised by the davit and set down in a cradle on the maintenance platform 17.

5. While the coupling part 7 is in the cradle on the maintenance platform 17, the seals can be inspected and replaced if required.

6. The second coupling part 8, supported by the davit 16 is positioned over the coupling part 7 and is lowered on to the top thereof. The male first coupling part 7 is then locked into the second coupling part or frame 8.

7. The assembled unit of coupling part 7 and frame 8 is then raised by the davit 16 and the davit is extended outboard. The coupling unit is lowered through the water to a position underneath the pontoon 2 by the cable 14 on the davit 16. The unit is then pulled into the mating position with the third or female part 9 by the lifting wires 12 passing through the pipes 11 in the mounting tank 10.

8. The male part of the coupling is now in position, inserted into the female part, and the hydraulic clamps are operated to lock the two halves of the coupling together.

In the event that it is required to disconnect the riser and bring it to upper deck level for inspection or maintenance of the coupling, then the sequence of operations is the reverse of the reconnect sequence above described.

The advantageous features of the above described system are:

1. The end of the riser can be located while it is lying on the sea bed and can be retrieved using a conventional offshore crane without assistance from another vessel.

2. The riser can be brought onboard the vessel for inspection of the coupling part on the end thereof.

3. The riser can be lowered over the side of the vessel and be mated with the other half of the coupling on the underside of the vessel without external assistance, such as small boats or divers.

4. The riser can be quickly disconnected from the coupling on the underside of the vessel, by remote operation.

5. The part of the coupling on the underside of the vessel can be dismounted and brought to the upper deck of the vessel without the need to drydock the vessel.

Figure 5:
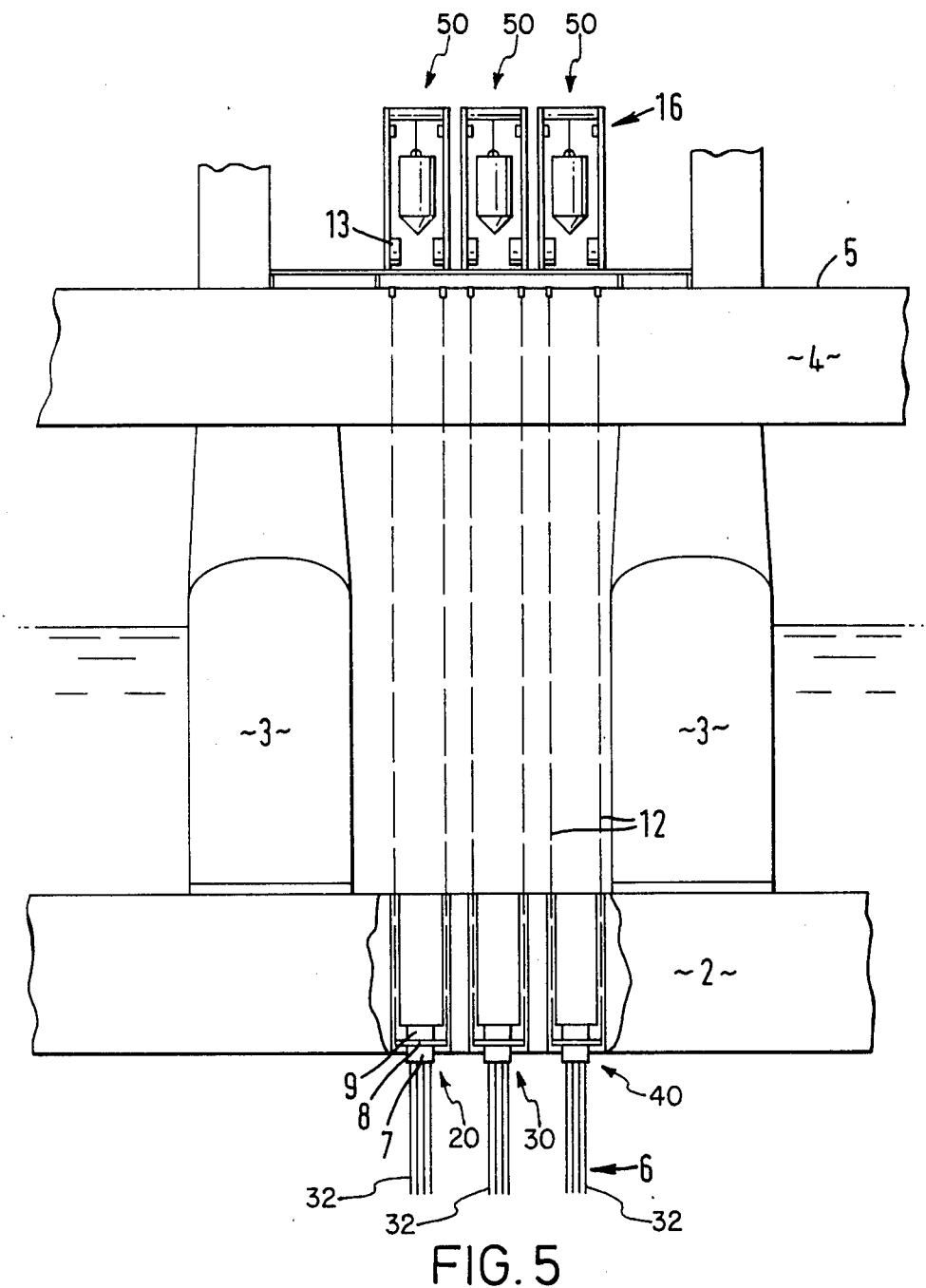
FIGS. 5 is a front view showing a multiple riser arrangement.

The above description with respect to FIGS. 1 to 4 relates to a single flexible pipe or riser. In practice, as illustrated in FIG. 5, as many as twelve risers 32, arranged in three groups of four, may be handled at three couplings 20, 30, 40 by use of three davits 50. The multiplicity of components in such a practical system does not affect the preceding simplified but general description of the handling system and the manner of use thereof.

I claim:

1. A method of coupling the free end of a riser extending from a sea bed location to a submerged portion of a floating structure provided with a riser handling system of the type including a first coupling part attached to the free end of the riser, a second coupling part for selective releasable connection to the first coupling part, a third coupling part attached to a submerged portion of the floating structure, and control means on the floating structure for moving the second coupling part, comprising the steps:

recovering the free end of the riser and positioning it at an above-water location on said floating structure;

operating the control means to move the second coupling part to said above-water location;

coupling said second coupling part to the first coupling part at said above-water location;

operating said control means to move the second coupling part with said first coupling part and hence the riser attached thereto from said above-water location to an underwater location on the floating structure; and, utilising said control means to couple the second coupling part to the third coupling part at said underwater location thereby effecting coupling of said riser to said floating structure.

2. A method according to claim 1 wherein said control means includes first and second winchable cable means each coupled to the second coupling part, including the steps of operating the winchable cable means to move said second part from below water to said above water location, and from said above water location to said underwater location on the floating structure.

3. The method according to claim 1 including davit means for lifting the riser, and including the step of lifting the riser to said above water location with the davit means.

4. A method according to claim 3 including a pennant buoy, and cable means coupling the buoy to the first coupling part, and coupling means on the pennant buoy to permit the davit means to lift the buoy, and including the step of using the davit means to lift the pennant buoy and thereby lift the riser to said above water location.

5. A method according to claim 1 including releasable latching means operable from the structure to release the connection between the coupling parts, and including the step of operating said releasable latching means.

* * * * *

UNITED STATES PATENT AND TRADEMARK OFFICE
CERTIFICATE OF CORRECTION

PATENT NO. : 4,695,191

DATED : September 22, 1987

INVENTOR(S) : William L. Wagstaff

It is certified that error appears in the above-identified patent and that said Letters Patent is hereby corrected as shown below:

Column 2, line 34, "flanges" should be -- flanged --.

Signed and Sealed this

Twenty-sixth Day of January, 1988

Attest:

DONALD J. QUIGG

*Attesting Officer*  *Commissioner of Patents and Trademarks*